Sept. 3, 1935.　　　J. H. CYPHERS　　　2,013,375
HYDRAULIC BRAKE
Filed April 17, 1935　　2 Sheets-Sheet 2
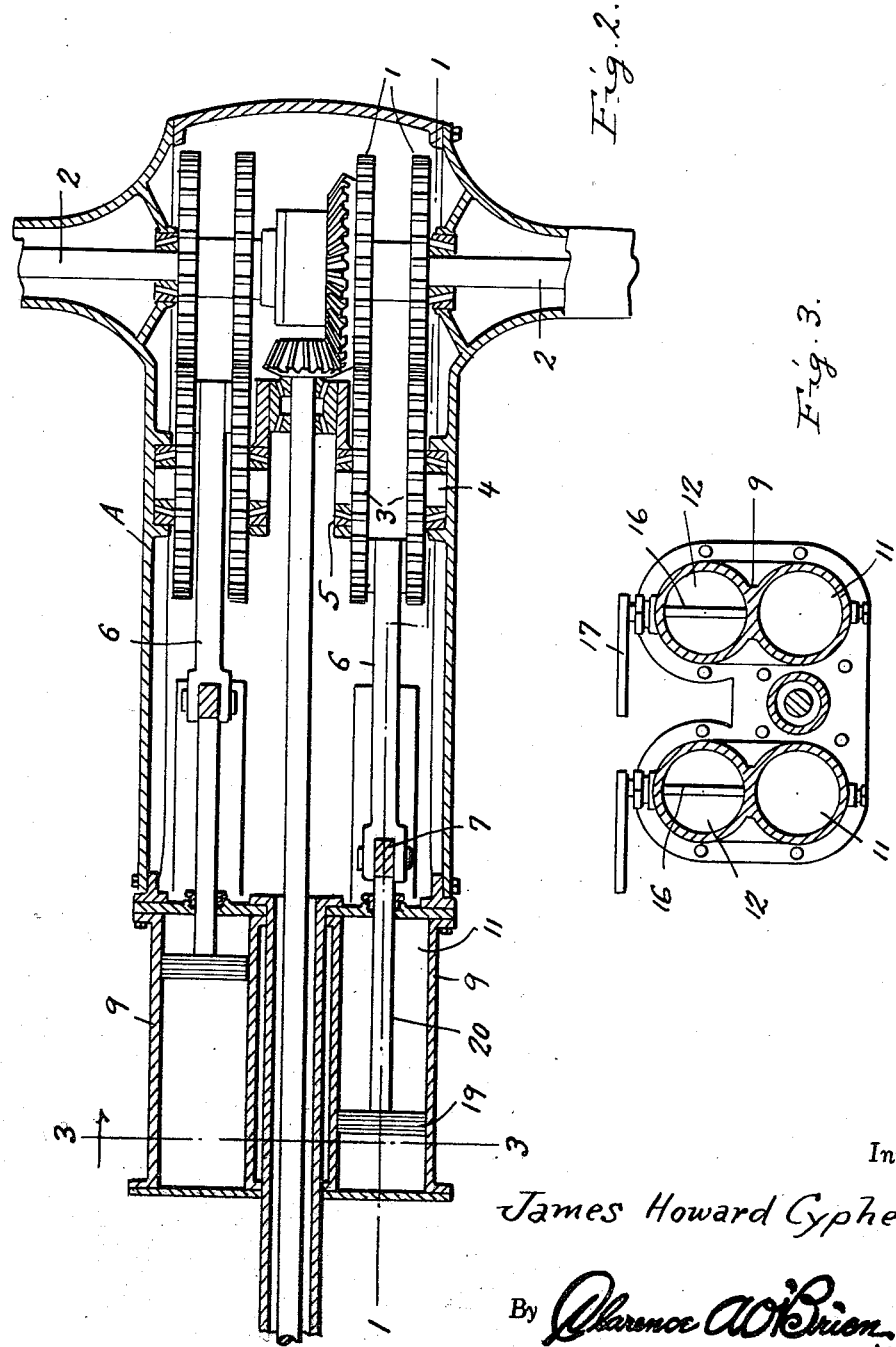
Inventor
James Howard Cyphers
By Clarence A. O'Brien
Attorney Patented Sept. 3, 1935

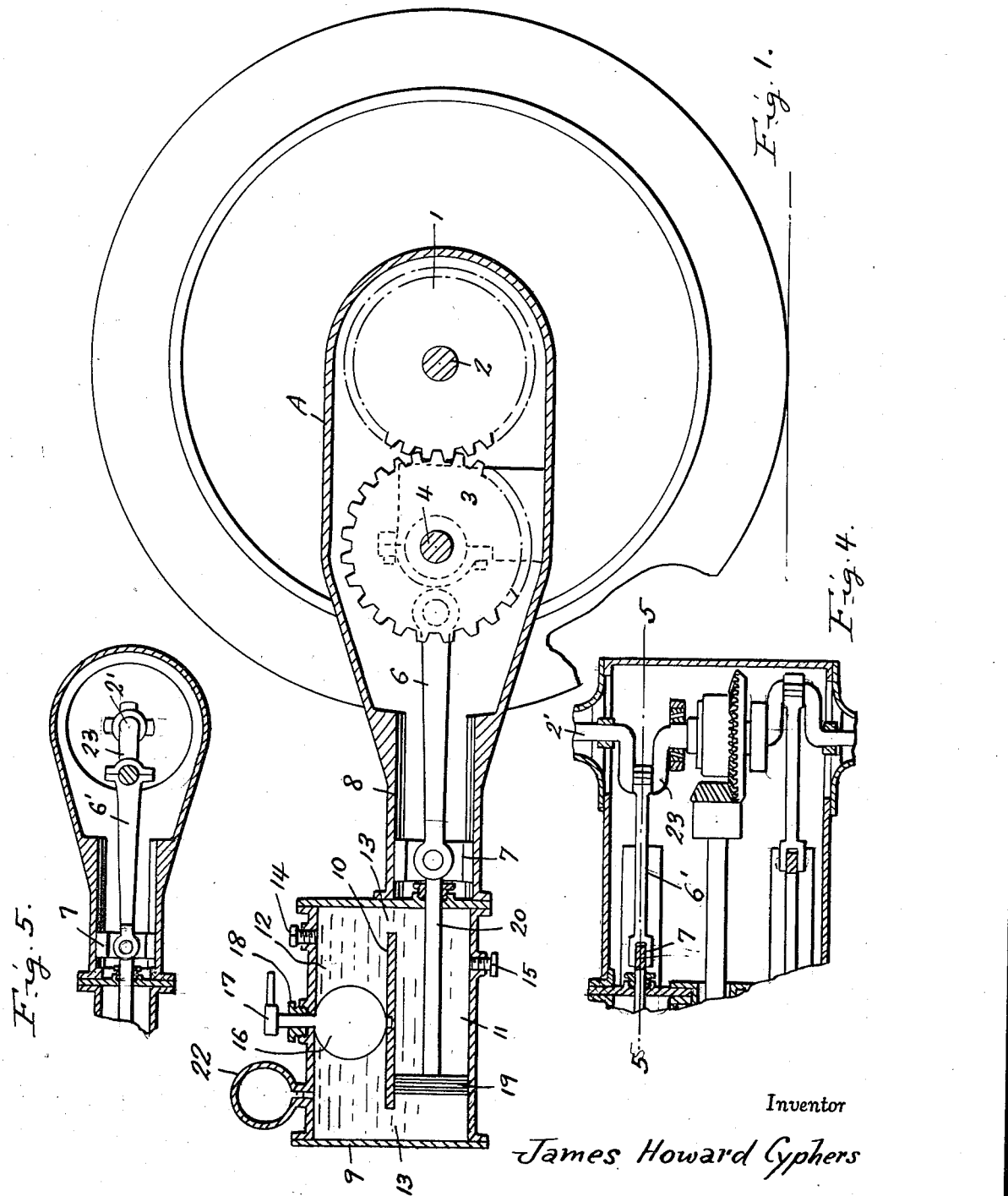

2,013,375

UNITED STATES PATENT OFFICE 2,013,375

HYDRAULIC BRAKE

James Howard Cyphers, Grand Junction, Colo.

Application April 17, 1935, Serial No. 16,871

2 Claims. (Cl. 188—99)

This invention relates to a hydraulic brake, the general object of the invention being to provide a brake of this nature that will not wear out and become hot by frequent use and which has an absolutely smooth controlling action and one which will instantly cause the wheels of the vehicle to which it is attached to stop rotation, thus checking and stopping the momentum of the vehicle at a minimum amount of time.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a vertical longitudinal sectional view of the invention with the wheels of the vehicle in elevation, the section being taken on the line 1—1 of Figure 2.

Figure 2 is a horizontal sectional view through Figure 1.

Figure 3 is a section on the line 3—3 of Figure 2.

Figure 4 is a fragmentary horizontal sectional view showing a modification.

Figure 5 is a section on the line 5—5 of Figure 4.

The invention is shown as applied to a motor vehicle, but it will of course be understood that the brakes can be used on other vehicles with but slight change to the means for operating the brakes in the axle of the vehicle.

In these drawings, the numeral 1 indicates a pair of gears suitably connected to each rear wheel shaft 2 of the vehicle and each pair of gears 1 mesh with a pair of gears 3 having trunnions 4 at their outer faces journaled by antifriction means 5 in supporting members carried by the housing A. A crank arm 6 is eccentrically connected with the gears of each pair 3 and each crank arm is connected to a cross head 7 operated in the guides 8 formed in the front end of the housing. A pair of cylinders 9 is connected to the front end of the housing, each cylinder being divided by a partition 10 into upper and lower chambers 11 and 12 which communicate with each other at their ends by the ports 13. A suitable fluid such as a light oil is introduced into the cylinders through an opening closed by a plug 14 and the oil can be drained from the cylinders through a lower opening closed by a plug 15. A valve 16 is centrally arranged in the upper chamber 12 and has a handle bearing part 17 extending through a packing gland 18 to the top part of the chamber. A piston 19 operates in the lower chamber 11 and the rod 20 thereon is pivoted to the cross head so that the piston will be reciprocated by the movement of the gears 13 when such gears are moved by the gears 1. It will of course be understood that when the valve 16 is open the fluid operated on by the piston will have free movement through one port 13 from the chamber 11, through the top chamber and through the other port 13 into the other end of the lower chamber and thus the movement of the piston will not interfere in any way with the movement of the vehicle. However, if the valve 16 is closed the fluid is trapped and thus the piston is prevented from moving. Of course, if the valve is partly open the movement of the piston is checked and will thus have a braking action on the vehicle wheels and without entirely stopping the vehicle. Of course, it will be understood that a suitable connection leads from the point adjacent the driver's seat to the valve and such means may be arranged to operate the valves in unison.

As it will be seen the braking device is very simple and there are no parts to get out of order so that it will have long life and as the parts operate in oil there is very little if any wear.

I also provide an air chamber 22 which is in position at the top of the cylinder which will make the system resilient, thus preventing damage to the parts in case of a sudden closing of the valve.

Figures 4 and 5 show a modification in which the gears are eliminated and each wheel carrying shaft 2' is formed with a crank 23 to which the connecting rod 6' is connected. This rod is connected with the cross head 7 as in the first form of the invention.

This arrangement enables the device to be manufactured at low cost as it eliminates the gears and the stub shafts 4 and the bearings for said shaft and it also enables the device to be shortened to a considerable extent.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a vehicle having a drive shaft, a gear on said shaft, a second gear rotatably supported and meshing with the first gear, a crank arm eccentrically pivoted to the second gear, a cross head to which the crank arm is pivoted, a cylinder divided into two chambers and having their ends in communication with each other, said cylinder containing oil, a piston in one chamber having its rod connected with the cross head, a valve in the other chamber and an air chamber in communication with the chamber containing the valve.

2. A brake for motor vehicles comprising a pair of gears attached to the rear wheel shaft of the vehicle, a housing, a pair of gears meshing with each of the first mentioned pair of gears and located in the housing, cross heads slidably arranged in the front part of the housing, crank arms eccentrically pivoted to the second mentioned gears and to the cross heads, a pair of cylinders each provided with two chambers with their ends in communication, a valve in one chamber, a piston in the other chamber, a rod connecting the piston to the cross head and an air chamber in communication with each cylinder.

JAMES HOWARD CYPHERS.